Oct. 25, 1955  F. R. SHULTZ  2,721,340

SHEATHED TOOL WITH LATCHING MEANS

Filed Feb. 12, 1953

INVENTOR
FRANK R. SHULTZ

BY Gustave Miller
ATTORNEY

United States Patent Office 2,721,340
Patented Oct. 25, 1955

2,721,340

SHEATHED TOOL WITH LATCHING MEANS

Frank R. Shultz, McFadden, Wyo.

Application February 12, 1953, Serial No. 336,523

2 Claims. (Cl. 7—8.1)

This invention relates to a combination tool handle and has for an object to provide an improved combination tool handle having one part which acts as a complete handle for one tool instrumentality and a second and complementary part on a second tool instrumentality which cooperates with first part to latch both tool instrumentalities together in readily separable position, so that the complementary parts act as a complete handle for the second tool instrumentality.

A further object of this invention is to provide a combination hatchet and knife with the hatchet having a hollow shank wherein the knife handle enables the knife to be used independently, and wherein the knife may be sheathed within the hollow shank of the hatchet and be held in latched relation thereto by a latch member on the shank complementary to the knife handle by the act of manually gripping the knife handle and complementary latch member.

A further object of this invention is to provide a combination tool handle for two tool instrumentalities wherein one complete tool instrumentality may have a part sheathed within a hollow shank of a second tool instrumentality, and the handle of one instrumentality cooperates with a latch on the other tool instrumentality to act as a handle for the other tool instrumentality, yet leaves the one tool instrumentality readily available for independent use.

A further object of this invention is to provide a combination tool handle and tool wherein one tool instrumentality of the combination may be a hatchet, hammer, or similar chopping or hammering tool, and the other tool may be a knife, dagger, screw driver, chisel or other similar male element shaped tool.

With the foregoing and other objects in view, this invention comprises the combination, construction and arrangement of parts hereinafter set forth, claimed and disclosed in the accompanying drawings, wherein:

Figure 1:
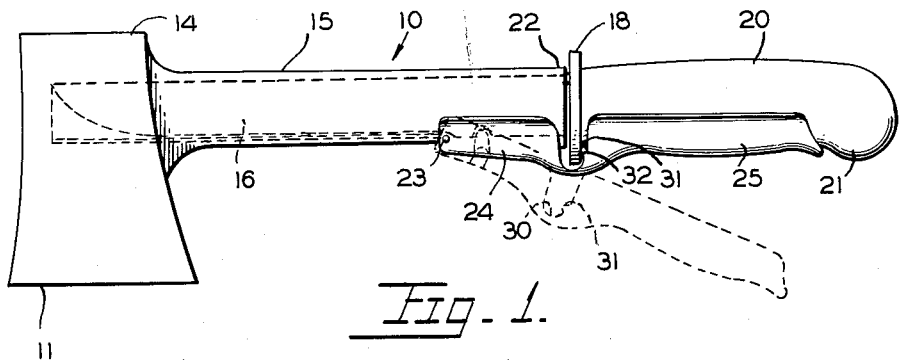
Fig. 1 is an elevation view of the combination tool handle and tool of this invention.
Figure 2:
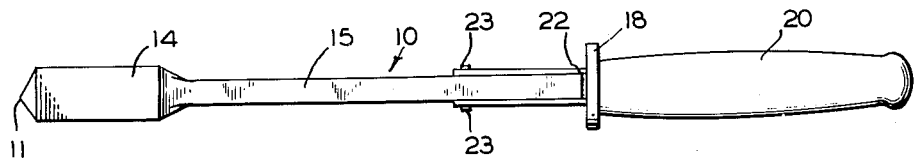
Fig. 2 is a top edge elevation view of Fig. 1.
Figure 3:
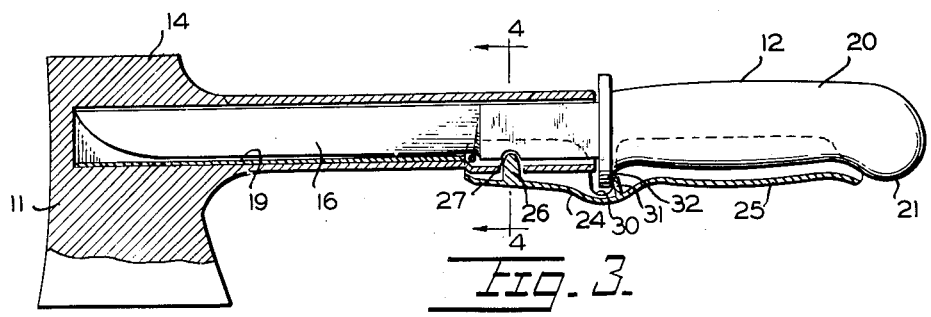
Fig. 3 is a partly longitudinal sectional view through the assembled combination tool handle.
Figure 4:
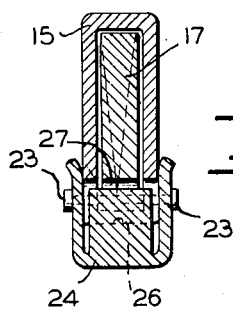
Fig. 4 is a sectional view on line 4—4 of Fig. 3.

There is shown at 10 the combination tool and tool handle wherein a first tool instrumentality is illustrated as being a hatchet 11 and a second tool instrumentality is illustrated as being a knife 12. The hatchet 11 is shown as having a customary hammer head 14 at the back thereof, and hollow shank 15, which may or may not be integral therewith, as shown. This hollow shank 15 is of a shape and size to receive therewith both the knife blade 16 and blade shank 17 as far as a handle guard 18 which is intermediate the blade shank 17 and the knife handle 20. A plastic strip 19 may be provided within the shank 15 to protect the knife edge. As illustrated, the blade handle 20 is of a shape and balance to be comfortably gripped by one's hand, and has enlarged knob 21 at the end thereof.

The handle guard 18 is a size and shape to abut against the open end 22 of the hatchet shank 15 and thus limit the entry of the knife blade 16 and blade shank 17 into the hatchet shank 15. Securely pivoted at 23 to the hatchet shank 15 adjacent its open end 22 is a lever latch 24 shaped substantially as shown so that its major portion 25 is complementary to and will overlie one edge of the knife handle 20 but preferably stopping short of the handle knob 21.

The lever latch 24 and the knife 12 each have complementary cooperating latch elements, two such cooperating pairs of latch elements being illustrated, although one or more pairs may be provided. One pair of latch elements includes a boss 26 projecting through an aperture 27 in the hatchet shank 15 and into a notch in the knife shank 17 and cooperates with a side wall thereof to prevent withdrawal of the blade 16 from the hatchet shank 15. A second pair of latch elements consists of a notch 30 having a side wall 31 abutting over and against the side wall 32 of the handle guard 18 that is on the side adjacent the knife handle 20, and also serves to prevent withdrawal of the knife blade 16 from the hatchet shank 15 while the second latch elements are in cooperating position.

With both pairs of latch elements present, as illustrated, the combination tool is held more firmly together when the lever latch 25 is positioned in overlying complementary position against the bottom of the knife handle 20. Placing one's hand about the handle 20 causes one's fingers to manually grip about the complementary major portion 25 of the lever latch 24 and thus firmly urge and hold the latch elements in cooperating position, thus holding the hatchet 11 securely on the knife 12 during use. When, however, the knife is wanted for use, it is quickly and readily available by merely releasing the manual gripping action, pivoting the latch lever 24 away from the handle 20 and then withdrawing the knife from its sheathing shank 15.

Although the invention has been illustrated as a hatchet and knife combination, it is obvious that a hammer or other chopping or hammering tool may be substituted, and likewise, instead of a knife, a dagger, screw driver, chisel, punch, or other male element shaped tool may be substituted.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. In a combination tool handle comprising a hollow shank having a tool instrumentality provided at one end thereof, the other end thereof being open, a second tool instrumentality of a size and shape to be received within said hollow shank, a handle extending from said second tool instrumentality and a handle guard located intermediate said handle and said second instrumentality of a size and shape greater than the open end of said shank to abut thereagainst; the improvement comprising a handle securing latch pivoted externally of said hollow shank adjacent its open end and shaped complementary to one side of said handle to overlie said handle in latched position, said handle and said latch having latching elements cooperating when said latch is pivoted into overlying position against said handle, said latching elements comprising a projecting boss on said latch and a cooperating complementary notch in said second tool instrumentality, said hollow shank having an aperture through which said cooperating boss projects into said cooperating notch, whereby when said second instrumentality and its latch is pivoted into latching position complementary to said second instrumentality handle, manually gripping said handle also grips said latch in latched position for utilizing said first tool instrumentality, and when said latch is pivoted away from the position complementary to said handle, said second tool instrumentality is readily withdrawable from said hollow shank for independent use.

2. In a combination tool handle comprising a hollow shank having a tool instrumentality provided at one end thereof, the other end thereof being open, a second tool instrumentality of a size and shape to be received within said hollow shank, a handle extending from said second tool instrumentality and a handle guard located intermediate said handle and said second instrumentality of a size and shape greater than the open end of said shank to abut thereagainst; the improvement comprising a handle securing latch pivoted externally of said hollow shank adjacent its open end and shaped complementary to one side of said handle to overlie said handle in latched position, said handle and said latch having latching elements cooperating when said latch is pivoted into overlying position against said handle, said latching elements comprising the side wall of a notch in said latch and the side of said handle guard on the handle side, and a projecting boss on said latch and a cooperating complementary notch in said second tool instrumentality, said hollow shank having an aperture through which said cooperating boss projects into said cooperating notch, whereby when said second instrumentality is sheathed within said first instrumentality shank and its latch is pivoted into latching position complementary to said second instrumentality handle, manually gripping said handle also grips said latch in latched position for utilizing said first tool instrumentality, and when said latch is pivoted away from the position complementary to said handle, said second tool instrumentality is readily withdrawable from said hollow shank for independent use.

References Cited in the file of this patent

UNITED STATES PATENTS

| | | |
|---|---|---|
| 660,204 | Seelye | Oct. 23, 1900 |
| 1,176,192 | Beckton et al. | Mar. 21, 1916 |
| 2,105,239 | Bachtold | Jan. 11, 1938 |
| 2,528,059 | Kendrick | Oct. 31, 1950 |

FOREIGN PATENTS

| | | |
|---|---|---|
| 506,625 | Germany | Sept. 6, 1930 |